United States Patent
Hehn et al.

(10) Patent No.: US 11,153,768 B2
(45) Date of Patent: Oct. 19, 2021

(54) VEHICLE, NETWORK COMPONENT AND APPARATUS FOR A MOBILE TRANSCEIVER, METHODS AND COMPUTER PROGRAMS FOR MULTI-CLIENT SAMPLING

(71) Applicants: Volkswagen Aktiengesellschaft, Wolfsburg (DE); MAN Truck & Bus AG, Munich (DE); Scania CV AB, Soedertaelje (SE)

(72) Inventors: Thorsten Hehn, Ingolstadt (DE); Teodor Buburuzan, Braunschweig (DE); Roman Alieiev, Stendal (DE); Joakim Cerwall, Stockholm (SE); Ernst Zielinski, Bochum (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 16/406,193

(22) Filed: May 8, 2019

(65) Prior Publication Data
US 2019/0349796 A1 Nov. 14, 2019

(30) Foreign Application Priority Data

May 8, 2018 (EP) .................................. 18171318

(51) Int. Cl.
*H04W 24/08* (2009.01)
*H04W 4/44* (2018.01)
(Continued)

(52) U.S. Cl.
CPC ............ *H04W 24/08* (2013.01); *H04W 4/44* (2018.02); *H04W 24/10* (2013.01); *H04W 28/0215* (2013.01); *H04W 28/0226* (2013.01)

(58) Field of Classification Search
CPC ....... H04W 24/08; H04W 4/44; H04W 24/10; H04W 28/0215
See application file for complete search history.

(56) References Cited

U.S. PATENT DOCUMENTS

| 7,562,123 B2 | 7/2009 | Reich et al. | |
|---|---|---|---|
| 2004/0137915 A1* | 7/2004 | Diener | H04W 12/08 |
| | | | 455/456.1 |

(Continued)

FOREIGN PATENT DOCUMENTS

| WO | 2017105743 A1 | 6/2017 |
|---|---|---|
| WO | 2018020045 A1 | 2/2018 |

OTHER PUBLICATIONS

Pedro M. d'Orey, et al.: "NAVI: Neighbor-Aware Virtual Infrastructure for Information Collection and Dissemination In Vehicular Networks".

*Primary Examiner* — Jael M Ulysse
(74) *Attorney, Agent, or Firm* — 2SPL Patent Attorneys PartG mbB; Kieran O'Leary

(57) ABSTRACT

Embodiments relate to methods and apparatuses for a vehicle, a network component, and a mobile transceiver performing multi-client sampling. A network component comprises one or more interfaces configured to communicate with mobile transceivers. It further comprises a control module configured to control interfaces and receive information on a multi-client sampling request as well as information on capabilities and status of a plurality of mobile transceivers. The control module is further configured to determine a subset of the mobile transceivers based on the information on the multi-client sampling request and on the capabilities and status. The subset comprises at least one mobile transceiver as cluster head and at least one other mobile transceiver. The control module is further configured to provide to the subset of mobile transceivers instructions (Continued)

to perform the multi-client sampling by collecting requested data at the cluster head using direct communication within the subset.

16 Claims, 4 Drawing Sheets

(51) Int. Cl.
*H04W 24/10* (2009.01)
*H04W 28/02* (2009.01)

(56) References Cited

U.S. PATENT DOCUMENTS

| | | | |
|---|---|---|---|
| 2006/0053216 A1* | 3/2006 | Deokar | G06F 9/5061 709/223 |
| 2006/0140135 A1* | 6/2006 | Bonta | H04L 45/04 370/254 |
| 2009/0036116 A1* | 2/2009 | Kim | H04W 24/10 455/423 |
| 2010/0074133 A1* | 3/2010 | Kim | H04J 3/0682 370/252 |
| 2010/0174802 A1* | 7/2010 | Chan | G06F 16/2343 709/219 |
| 2011/0151839 A1* | 6/2011 | Bolon | H04W 4/029 455/414.1 |
| 2013/0316696 A1* | 11/2013 | Huang | H04W 52/0212 455/419 |
| 2014/0164468 A1* | 6/2014 | Yamashita | H04L 67/10 709/201 |
| 2015/0049632 A1* | 2/2015 | Padmanabhan | H04L 67/34 370/254 |
| 2016/0200166 A1* | 7/2016 | Stanek | B60H 1/00657 165/202 |
| 2017/0013424 A1* | 1/2017 | Saeki | H04W 84/20 |
| 2017/0013578 A1* | 1/2017 | Wei | H04W 8/005 |
| 2017/0032198 A1* | 2/2017 | Gupta | G06T 7/277 |
| 2017/0085436 A1* | 3/2017 | Costa | G06F 3/0484 |
| 2017/0193552 A1* | 7/2017 | Wang | H04L 67/26 |
| 2017/0248965 A1* | 8/2017 | Wellman | G05D 1/0297 |
| 2017/0324817 A1* | 11/2017 | Oliveira | H04L 67/10 |
| 2017/0369067 A1* | 12/2017 | Saigusa | B60W 30/18163 |
| 2018/0012198 A1* | 1/2018 | Ricci | G06Q 20/4012 |
| 2018/0087913 A1* | 3/2018 | Biswas | G01C 21/3688 |
| 2018/0106622 A1* | 4/2018 | Biswas | G01C 21/30 |
| 2018/0164401 A1* | 6/2018 | Hergesheimer | G01S 5/0294 |
| 2018/0261020 A1* | 9/2018 | Petousis | G07C 5/0841 |
| 2019/0007484 A1* | 1/2019 | Chen | H04W 4/40 |
| 2020/0077892 A1* | 3/2020 | Tran | A61B 5/0006 |

* cited by examiner

VEHICLE, NETWORK COMPONENT AND APPARATUS FOR A MOBILE TRANSCEIVER, METHODS AND COMPUTER PROGRAMS FOR MULTI-CLIENT SAMPLING

FIELD

The present invention relates to a vehicle, a network component, an apparatus for a mobile transceiver, methods and computer programs for multi-client sampling, more particularly, but not exclusively, to a concept for multi-client sampling in a traffic environment.

BACKGROUND

Automated or autonomous driving is a field of research and development. One concept, which is or will be further introduced relates to collecting sensor data from vehicles. For example, temperature, visual, and telemetric data may be sensed in a vehicle and then provided to a logic entity, e.g. by means of cellular wireless communication. Such information may then be used in Advanced Driving Assistance Systems (ADAS). Furthermore, sensors such as cameras are installed at critical traffic points, e.g. intersections, tunnels, crossings etc. Data obtained using these traffic monitoring cameras can be used for traffic management and to detect emergency situations after accidents.

A concept introduced for dealing with high traffic loads is platooning, in which vehicles are grouped and which may allow making more efficient use of the road capacity. The groups of vehicles, also referred to as convoys or platoons, may be used to operate the vehicles in the group with a short distance or headway between the vehicles, as the vehicles within the group may react within a short time delay or (almost) simultaneously. This is achieved by using direct communication within the group to exchange sensor and control data between the group members. Control mechanisms can be implemented among vehicles of the group.

For example, document US 2017/0032198 A1 describes a concept for detecting objects of interest exterior to a vehicle based on hypothesis filtering of image data. Document US 2017/0369067 A1 discloses a vehicle control system wherein a host vehicle receives speed message packets from remote vehicles and sensor data of the host vehicle is used to locate the remote vehicles to determine a lane merging decision. Document WO 2018/020045 A1 describes a method for merging data from multiple object detectors in a vehicle.

There is a demand for an improved concept for collecting data in a vehicular environment. The independent claims provide an improved for collecting data in a vehicular environment.

SUMMARY

Embodiments are based on the finding that mobile transceivers and vehicles in particular, are equipped with more and more sensors. Hence, vehicular or mobile transceiver sensors may be used to sample a real live situation or scene. Moreover, it is a finding of embodiments that the amount of data gathered by these sensors is massive and central data processing would involve communicating these massive amounts of data consuming valuable wireless resources. It is a further finding that a group or a subset of vehicles or mobile transceivers in general can be defined for data collection and group or subset internal data processing. Processed data may then be communicated from the group to an external entity. It is a finding of embodiments that from the mobile transceivers registered in a mobile communication system a cluster, subset or group can be selected and instructed with a multi-client sampling task by a network component, e.g. to generate an image of a certain object. In the group or cluster a cluster head can be specified to collect data from other cluster members and communicate the data back to the network component.

Embodiments provide a network component of a mobile communication system. Another embodiment is a base station or server comprising an embodiment of the network component. The network component comprises one or more interfaces, which are configured to communicate with mobile transceivers of the mobile communication system. The network component further comprises a control module configured to control the one or more interfaces. The control module is further configured to receive information on a multi-client sampling request and to receive information on capabilities and status of a plurality of mobile transceivers of the mobile communication system. The control module is further configured to determine a subset of the plurality of mobile transceivers based on the information on the multi-client sampling request and based on the information on the capabilities and status, wherein the subset of mobile transceivers comprises at least one mobile transceiver as cluster head and at least one other mobile transceiver. The control module is configured to provide instructions to the mobile transceivers of the subset to perform the multi-client sampling based on the multi-client sampling request by collecting requested data at the cluster head mobile transceiver using direct communication within the subset of mobile transceivers. Embodiments enable a network component to form or determine a subset or group of mobile transceivers to carry out a multi-client sampling task and to obtain the data from an assigned cluster head. By using direct communication within the subset communication resources to the network infrastructure can be conserved.

Embodiments also provide an apparatus for a mobile transceiver. Another embodiment is a mobile transceiver comprising an embodiment of the apparatus and yet another embodiment is a vehicle comprising an embodiment for the mobile transceiver or apparatus. The apparatus comprises one or more interfaces configured to communicate with a network component of a mobile communication system and configured to communicate with one or more further mobile transceivers directly. The apparatus further comprises a control module configured to control the one or more interfaces. The control module is further configured to provide information on capabilities and status to the network component of the mobile communication system, and to receive information on instructions from the network component on a multi-client sampling request. The control module is further configured to collect data based on the information on the instructions, and to enable cluster head data processing of the data based on the information on the instructions. Embodiments may enable efficient sensor data processing using direct communication in a group of mobile transceivers of a mobile communication system.

In embodiments, at the network component the information on the multi-client request may comprise information on a geographical area the multi-client request relates to, and the control module may be configured to adapt the subset of mobile transceivers based on the information on the geographical area and based on the location of the mobile transceivers. Embodiments may enable an efficient selection scheme for mobile transceivers in a certain geographical area for sensing and/or providing corresponding sensor data. Moreover, in further embodiments the control module may be configured to assign and/or reassign a role of the cluster head to a mobile transceiver based on the information on the geographical area, based on a connectivity status of the mobile transceiver, and based on the location of the mobile transceiver. Embodiments may enable to efficiently select mobile transceivers for data sensing on one side and for data communication on the other side, enabling a more efficient overall concept.

The information on the multi-client sampling request may comprise information on a request to sample one or more elements of the group of a location, an intersection, a city, a city center, a landscape, a vehicle, an object of interest, a point of interest, and a route section. Embodiments may enable efficient utilization of mobile transceivers and their sensor sets for multi-client sampling. The control module of the network component can be further configured to obtain sampled multi-client data from the cluster head. Embodiments may enable efficient data sensing and providing using a subset of mobile transceivers of the mobile communication system with an assigned cluster head. The control module may be further configured to set or configure an update rate for update provision at the cluster head. Embodiments may enable efficient cluster head role assignment, e.g. depending on the multi-client sampling request, the location of the involved mobile transceivers, and the duration of the request, etc.

In some embodiments at the apparatus for the mobile transceiver the information on the instruction comprises information on assuming the role of a cluster head of the multi-client sampling request. Hence, the apparatus is then configured to assume the role of the cluster head. The control module at the apparatus may be configured to receive information on data collected by another mobile transceiver. The control module may be configured to process the collected data and the data collected by the other mobile transceiver as cluster head. Moreover, the control module at the apparatus may then be configured to provide the processed data to the network component. Embodiments may enable a mobile transceiver to assume the role of a cluster head in line with the above.

In other embodiments another mobile transceiver may be configured as cluster head. The information on the instruction may then comprise information on another mobile transceiver assuming the role of a cluster head of the multi-client sampling request. The control module at the apparatus may then be configured to provide information on collected data to the other mobile transceiver. Embodiments may also allow configuration of a mobile transceiver as non-cluster head, e.g. in a slave mode within the subset mobile transceivers while the cluster head mobile transceiver assumes a master role. Embodiments may enable adaptively configurable mobile transceivers. The information on capabilities may comprises one or more elements of the group of information on available sensors, information on a location or position of the mobile transceiver, and information on communication capabilities of the mobile transceiver. Embodiments may base the mobile transceiver selection for the subset on such information and may enable efficient subset forming. In embodiments the control module at the apparatus may be further configured to update location information of the mobile transceiver at the network component. Embodiments may therewith be provided with a basis for efficient and adaptive subset management and cluster head assignment.

A further embodiment is a method for a network component of a mobile communication system. The method comprises receiving information on a multi-client sampling request, and receiving information on capabilities and status of a plurality of mobile transceivers of the mobile communication system. The method further comprises determining a subset of the plurality of mobile transceivers based on the information on the multi-client sampling request and based on the information on the capabilities and status. The subset of mobile transceivers comprises at least one mobile transceiver as cluster head and at least one other mobile transceiver. The method further comprises providing instructions to the mobile transceivers of the subset to perform the multi-client sampling based on the multi-client sampling request by collecting requested data at the cluster head mobile transceiver using direct communication within the subset of mobile transceivers.

A further embodiment is a method for a mobile transceiver. The method further comprises providing information on capabilities and status to a network component of the mobile communication system, and receiving information on instructions from the network component on a multi-client sampling request. The method further comprises collecting data based on the information on the instructions, and enabling cluster head data processing of the data based on the information on the instructions.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Some other features or aspects will be described using the following non-limiting embodiments of apparatuses or methods or computer programs or computer program products by way of example only, and with reference to the accompanying figures, in which:

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
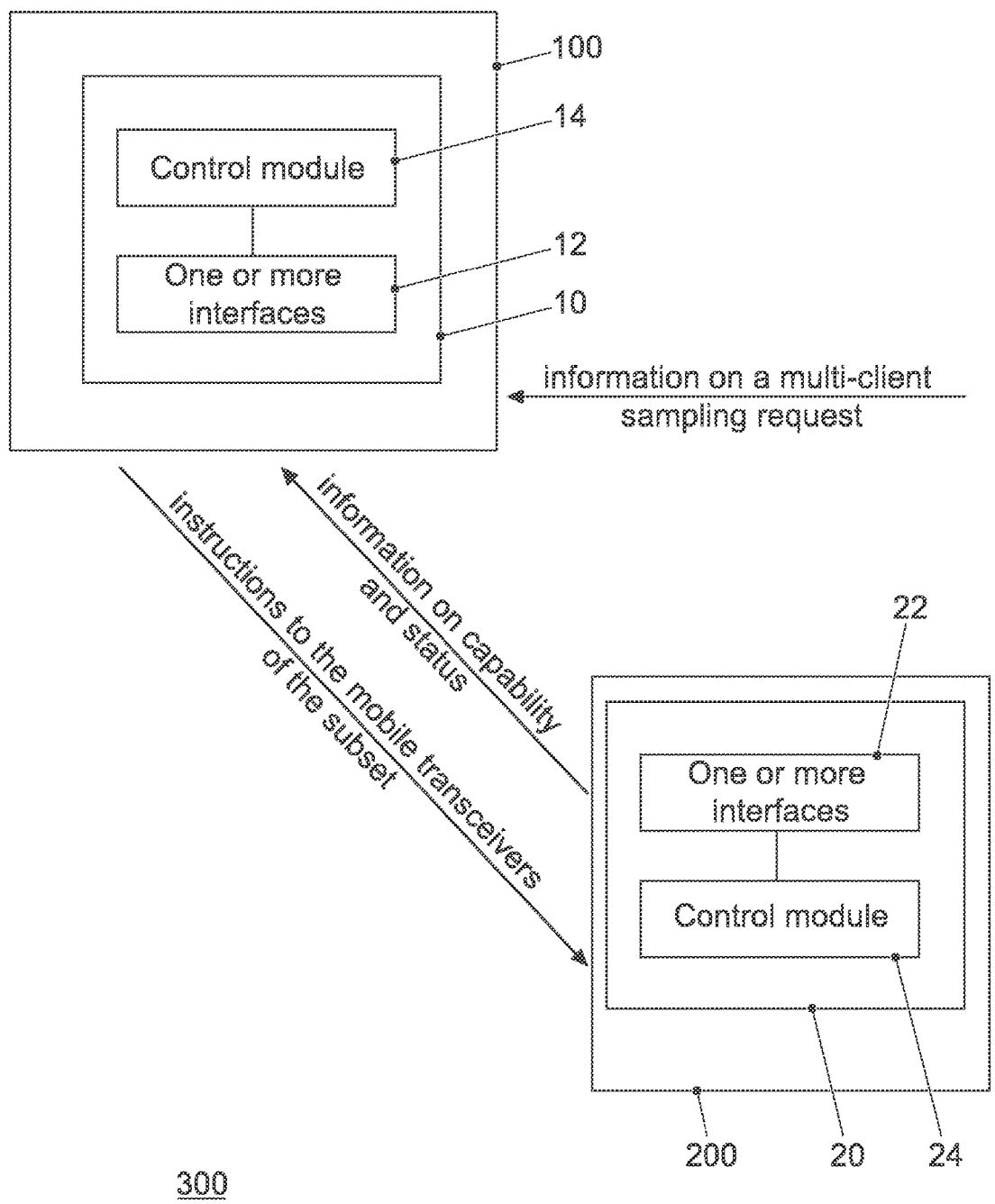
FIG. 1 illustrates embodiments of a network component, a network server, an apparatus for a mobile transceiver and a mobile transceiver.

FIG. 1 illustrates embodiments of a network component 10, a network server 100, an apparatus 20 for a mobile transceiver 200 and a mobile transceiver 200.

FIG. 1 shows an embodiment of a network component 10 of a mobile communication system 300. The network component 10 is comprised in a network server 100, which is configured to communicate with mobile transceivers using the mobile communication system 300. In other embodiments the network component may be comprised in a base station or a network controller of the mobile communication system 300. The network component 10 comprises one or more interfaces 12, which are configured to communicate with mobile transceivers, e.g. mobile transceiver 200 in FIG. 1 and likewise mobile transceivers 200, 201, 202, 203, 204 in FIG. 2, of the mobile communication system 300. The network component 10 further comprises a control module 14, which is coupled to the one or more interfaces 12 and which is configured to control the one or more interfaces 12. The control module 14 is further configured to receive information on a multi-client sampling request, and to receive information on capabilities and status of a plurality of mobile transceivers 200, 201, 202, 203, 204 of the mobile communication system 300.

The control module 14 is configured to determine a subset of the plurality of mobile transceivers 200, 201, 203 based on the information on the multi-client sampling request and based on the information on the capabilities and status. The subset of mobile transceivers 200, 201, 203 comprises at least one mobile transceiver as cluster head 201 and at least one other mobile transceiver 200, 203. The control module 14 is configured to provide instructions to the mobile transceivers 200, 201, 203 of the subset to perform the multi-client sampling based on the multi-client sampling request by collecting requested data at the cluster head 201 mobile transceiver using direct communication within the subset of mobile transceivers 200, 201, 203.

Direct communication is to be understood as transmission and reception of wireless signals between mobile devices/transceivers directly without the need to transmit signals to a base station of a mobile communication system, and to forward the information from the base station to the destination. For example, the third Generation Partnership Project (3GPP) specified certain mechanisms for direct communication between mobile transceivers, also referred to as Device-to-Device (D2D) communication. 3GPP also defined such mechanisms for inter-vehicular communication, which is also referred to as Vehicle-to-Vehicle (V2V) communication.

The request for sampled data may have different origins. For example, some network entity may request image or other data of a certain location. An example would be server of a traffic supervision entity. Another example would we a private user requesting image data or traffic data along a certain route, e.g. for trip planning purposes. In embodiments the request may hence originate at different network entities.

FIG. 1 also illustrates an embodiment of an apparatus 20 for a mobile transceiver 200, 201, 202, 203, 204. The apparatus 20 comprises one or more interfaces 22, which are configured to communicate with the network component 10 of the mobile communication system 300 and which are configured to communicate with one or more further mobile transceivers directly. The apparatus 20 further comprises a control module 24, which is coupled to the one or more interfaces 22 and which is configured to control the one or more interfaces 22. The control module 24 is further configured to provide information on capabilities and status to the network component 10 of the mobile communication system 300, and to receive information on instructions from the network component 10 on a multi-client sampling request. The control module 24 is further configured to collect data based on the information on the instructions, and to enable cluster head 201 data processing of the data based on the information on the instructions.

In embodiments the one or more interfaces 12, 22, may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 12, 22 may comprise further components to enable according communication in the mobile communication system 300, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12, 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12, 22 may serve the purpose of transmitting or receiving or both, transmitting and receiving, information, such as information related to capabilities, application requirements, requests, message interface configurations, feedback, information related to control commands etc.

As shown in FIG. 1 the respective one or more interfaces 12, 22 are coupled to the respective control modules 14, 24 at the network component 10 and the apparatus 20. In embodiments the control modules 14, 24 may be implemented using one or more processing units, one or more processing devices, any means for processing, such as a processor, a computer or a programmable hardware component being operable with accordingly adapted software. In other words, the described functions of the control modules 14, 24 may as well be implemented in software, which is then executed on one or more programmable hardware components. Such hardware components may comprise a general purpose processor, a Digital Signal Processor (DSP), a micro-controller, etc.

FIG. 1 also shows an embodiment of a system 300 comprising embodiments of the network component 10 and a mobile transceiver apparatus 20, network controller/server or base station 100 and mobile transceiver 200, respectively. In embodiments, communication, i.e. transmission, reception or both, make take place among mobile transceivers 100, 200 directly and/or between mobile transceivers 100, 200 and a network infrastructure component. Such communication may make use of a mobile communication system 300. In other words such communication may be carried out directly, e.g. by means of Device-to-Device (D2D) communication, which may also comprise Vehicle-to-Vehicle (V2V) communication in case the mobile transceivers 100, 200 are implemented in vehicles as will be detailed subsequently. Such communication may be carried out using the specifications of a mobile communication system 300.

The mobile communication system 300 may, for example, correspond to one of the Third Generation Partnership Project (3GPP)—standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers 200, 201, 202, 203, 204 and a base station transceiver can be located in or adjacent to a coverage area of another base station transceiver, e.g. a macro cell base station transceiver or small cell base station transceiver. Hence, embodiments may provide a mobile communication system 300 comprising two or more mobile transceivers 200, 201, 202, 203, 204 and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)—stick, a car, a vehicle etc. A mobile transceiver may also be referred to as User Equipment (UE) or mobile in line with the 3GPP terminology. A vehicle may correspond to any conceivable means for transportation, e.g. a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 200, 201, 202, 203, 204 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 200, 201, 202, 203, 204 may communicate directly with each other, i.e. without involving any base station transceiver, which is also referred to as Device-to-Device (D2D) communication. An example of D2D is direct communication between vehicles, also referred to as Vehicle-to-Vehicle communication (V2V). In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

Figure 2:
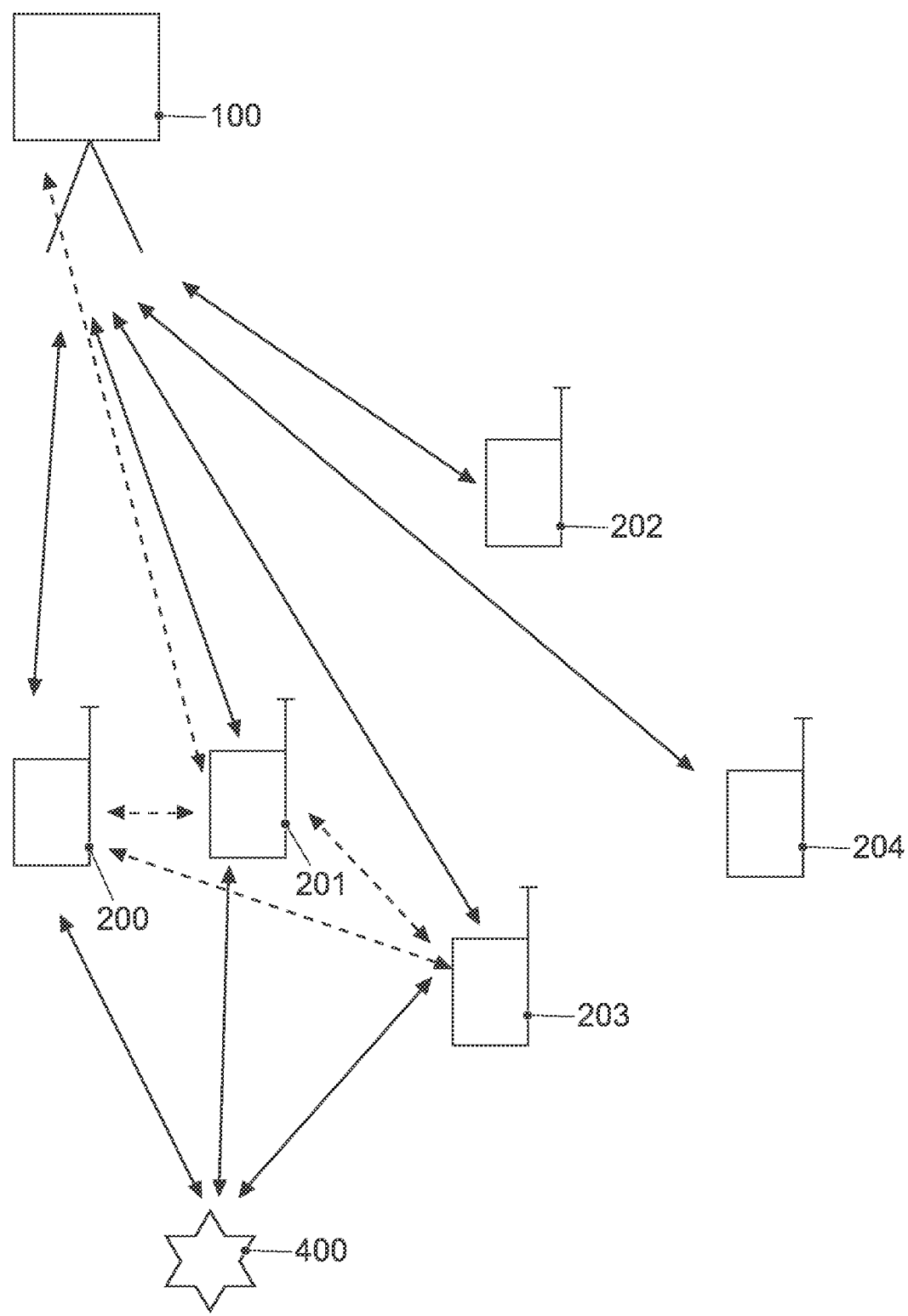
FIG. 2 shows embodiments of a network component and mobile transceivers forming a subset with a cluster head.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In embodiments the two or more mobile transceivers 200, 201, 202, 203, 204 as indicated by FIGS. 1 and 2 may be registered in the same mobile communication system 300. In other embodiments one or more of the mobile transceivers 200, 201, 202, 203, 204 may be registered in different mobile communication systems 300. The different mobile communication systems 300 may use the same access technology but different operators or they may use different access technologies as outlined above.

FIG. 2 shows further embodiments of a network component and mobile transceivers forming a subset with a cluster head. FIG. 2 shows a base station 100 of a mobile communication system comprising an embodiment of the network component 10 as described in FIG. 1. FIG. 2 further illustrates five mobile transceivers 200, 201, 202, 203, 204, which all provide information on their capabilities and status to the base station 100 as indicated by the solid line arrows in FIG. 2. For example, the mobile transceivers 200, 201, 202, 203, 204 are vehicles all being located in the same area, e.g. around a certain object 400 as indicated in FIG. 2. The object 400 may for example, correspond to an intersection. In embodiments the information on the multi-client sampling request may, for example, comprise information on a request to sample one or more elements of the group of a location, an intersection, a city, a city center, a landscape, a vehicle, an object of interest, a point of interest, and a route section.

For example, the base station 100 receives a request to provide image data of said intersection 400 and now determines a subset of mobile transceivers, e.g. a cluster of mobile transceivers, based on the capability and status information. In the present embodiment the base station 100 determines that mobile transceivers 200, 201, and 203 are in line of sight of the intersection 400 and hence configures or selects these mobile transceivers 200, 201, 203 for the cluster or subset. Within the subset direct communication (D2D, V2V) is used as indicated by the broken line arrows in FIG. 2. In some embodiments multi-hop communication is also conceivable. In some embodiments mobile transceivers may use direct communication with another mobile transceiver, which in turn uses direct communication to forward or relay signals to a further mobile transceiver, e.g. with a cluster head as will be detailed subsequently.

Embodiments may enable an efficient method to sample given entities (such as intersections, cities, landscapes) with multiple vehicular clients. Embodiments may avoid a high amount of traffic to be sent to the network component 10 (backend server/base station 100), which hosts and controls the service, by using direct communication within the subset or cluster. Embodiments may allow provision of a sampled entity with low delay (e.g. "live view" of an intersection or important part of the city center). Embodiments may hence provide important information when self-driving vehicles enter a scene.

Embodiments may hence use both direct communication between vehicles (PC5 interface) and communication with the backend (Uu interface, mobile-to-base station communication) to create a multi-party sampling of given entities. As an example, a visualization of an intersection 400 may be generated using multiple cameras on multiple vehicles 200, 201, 203. In the following embodiments a central backend server 100 is assumed, and multiple vehicles 200, 201, 202, 203, 204 in the field as depicted in FIG. 2. Further, it is assumed that there is a cellular connection between the backend server 100 and each vehicle 200, 201, 202, 203, 204 as indicated by the solid line arrows in FIG. 2. There may also be a direct connection between each pair of vehicles 200, 201, 202, 203, 204, and there may be multi-hop communication as indicated above. This connection may be spotty, i.e. it might exist or not.

In an embodiment each vehicle 200, 201, 202, 203, 204 that supports multi-client vehicular sampling informs the central backend-server 100 about its existence and its capabilities (including sensors, positioning, and other technical details). The vehicle 200, 201, 202, 203, 204 and the server 100 agree on an update rate at which the vehicle 200, 201, 202, 203, 204 updates the central backend server 100 on its position.

For example, a participant has requested the sampling of a given entity 400. The backend server 100 identifies or determines possible contributors to a multi-sampling view of the entity. For example, the information on the multi-client request comprises information on a geographical area the multi-client request relates to. The control module 14 is configured to adapt the subset of mobile transceivers 200, 201, 203 based on the information on the geographical area and based on the location of the mobile transceivers 200, 201, 202, 203, 204. In some embodiments such subset adaptation may be carried out by multicasting information on the sampling request in a certain geographical area, e.g. a cell or a sector in which the object 400 is located. Mobile transceiver leaving or entering the geographical area may hence automatically be added or removed from the subset. In embodiments the geographical area can also be defined by means of certain coordinates and the mobile transceiver may determine whether they are in the geographical area or not by evaluating their own location. In embodiments, instructions may be provided by a broadcast or multicast messaging, which may also comprise information on a cluster head to forward data to.

Based on the number of available contributors, their position, and their capabilities, the server 100 may decide whether a multi-client vehicular sampling of this entity is currently possible. As indicated in FIG. 2 in the present embodiment it is assumed that such a sampling is possible. The information on capabilities may comprise one or more elements of the group of information on available sensors, information on a location or position of the mobile transceiver, and information on communication capabilities of the mobile transceiver. The communication capabilities may comprise capabilities (e.g. data rate, latency, etc.) for communication with the network infrastructure as well as information on capabilities with other mobile transceivers. The control module 24 may be configured to update location information of the mobile transceiver 200, 201, 202, 203, 204 at the network component 10.

The backend server 100 may instruct all vehicles 200, 201, 203 that are required for multi-client vehicular sampling. These instructions may include Per vehicle and sensor: one recording assignment including sensor, absolute time, absolute location, and settings (e.g. field of view, etc.).

The backend server 100 elevates one vehicle to become the cluster head 201 and announces this choice to all other vehicles 200, 203. The information on the instruction may comprise information on assuming the role of a cluster head 201 of the multi-client sampling request. The control module 24 at the apparatus 20 is then configured to receive information on data collected by another mobile transceiver 200, 203. The control module 24 may also be configured to process the collected data and the data collected by the other mobile transceiver 200, 203 as cluster head 201. The control module 24 may then also be configured to provide the processed data to the network component 30.

For the non-cluster head mobile transceivers 200, 203, the information on the instruction comprises information on another mobile transceiver assuming the role of the cluster head 201 of the multi-client sampling request. Their control module 24 is then configured to provide information on collected data to the other mobile transceiver 201 (cluster head).

The cluster head 201 will receive information on how to process the information retrieved from all other vehicles 200, 203 (including its own). The control module 14 is configured to assign and/or reassign the role of the cluster head based on the information on the geographical area, based on a connectivity status of the mobile transceivers 200, 201, 202, 203, 204, and based on the location of the mobile transceivers 200, 201, 202, 203, 204. In the present embodiment the cluster head 201 also contributes to the sampling of the data by using its own sensors, as also shown in FIG. 2. In other embodiments the cluster head 201 may not be able to obtain data samples by its own, e.g. because it is not located in line of sight of the target 400. It may still be selected as cluster head 201 in some embodiments, e.g. when its data connectivity, e.g. a supported data rate to the network is better than the one of the other participants. The direct communication within the subset or cluster may then be used to extent the potential sampling coverage of the network. In such a scenario the role of the cluster head may be assigned based on its communication capacities within the subset and to the back end 100.

The process of sampling itself may be defined such that its output can be readily sent to the backend server 100. There are various ways for specifying the processing in embodiments. In an illustrative example, the server 100 may compile an executable for the cluster head's 201 computer platform and sends the executable to the cluster head 201. The control module 14 of the network component may then be configured to obtain the sampled multi-client data from the cluster head 201. Furthermore, in embodiments the control module 14 may be further configured to configure or set an update rate for update provision at the cluster head 201.

To keep the capturing of the entity going (e.g. for the live view of an intersection), the server 100 may send new assignments to new vehicles which come into range. Also, it may update the processing information for the cluster head or assign a new cluster head.

An incentive to serve as a client or cluster head would be to retrieve credits from the server. These credits could be used to request sampling of entities from the server. In embodiments the control modules 14, 24 of the network component 10 and the apparatus 20 may be configured to enable a credit based incentive system. At the network component 10 the control module 14 may be configured to provide credits to participants of the subset and to deduct credits for providing the result to a multi-client sampling request. At the apparatus 20 the control module 24 may be configured to correspondingly provide credit for a request and to receive credits for its participation.

Figure 3:
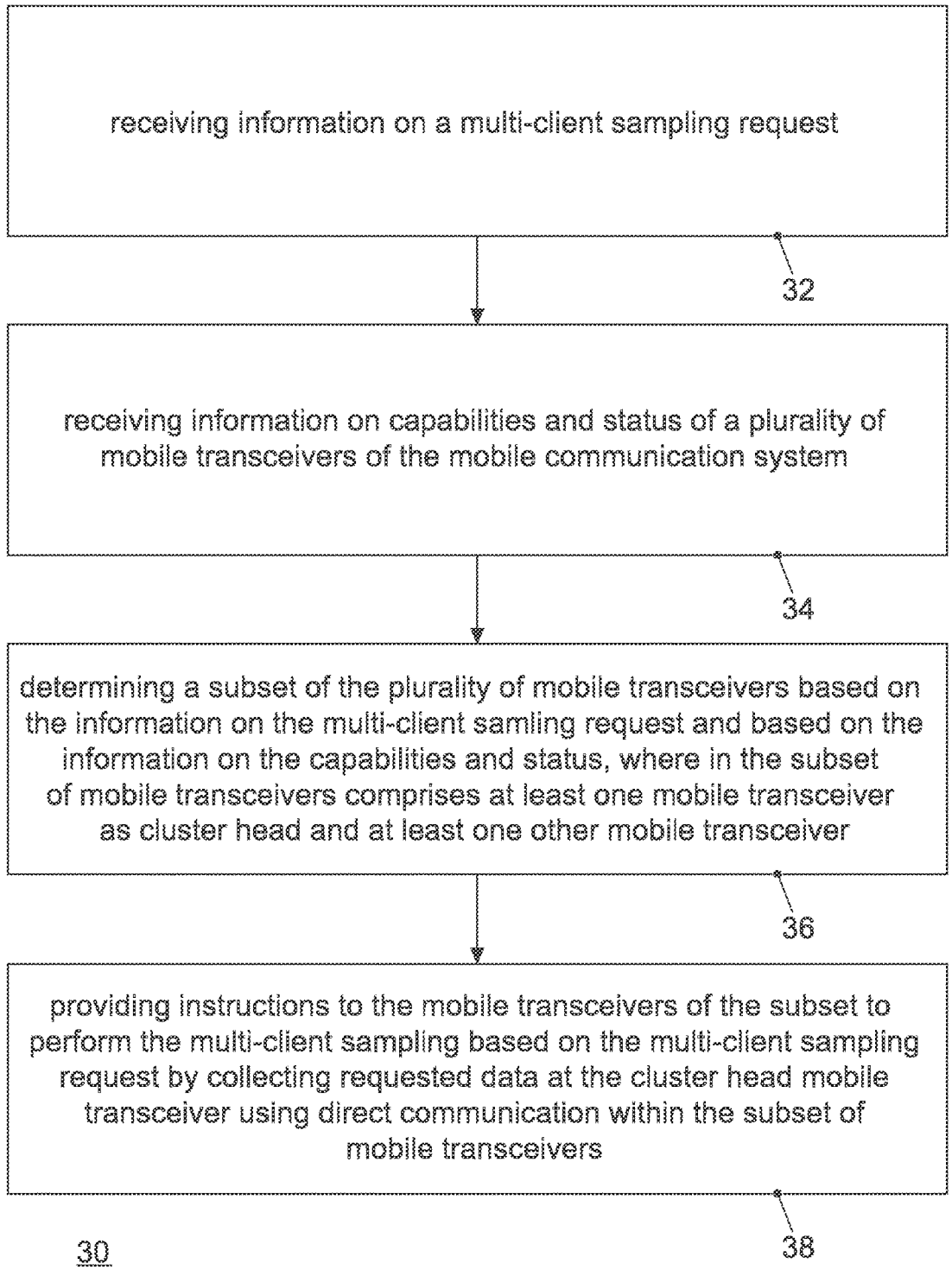
FIG. 3 shows a block diagram of a flow chart of an embodiment of a method for network component.

FIG. 3 shows a block diagram of a flow chart of an embodiment of a method 30 for a network component 10 of a mobile communication system 300. The method 30 comprises receiving 32 information on a multi-client sampling request, and receiving 34 information on capabilities and status of a plurality of mobile transceivers 200, 201, 202, 203, 204 of the mobile communication system 300. The method 30 further comprises determining 36 a subset of the plurality of mobile transceivers 200, 201, 203 based on the information on the multi-client sampling request and based on the information on the capabilities and status. The subset of mobile transceivers 200, 201, 203 comprises at least one mobile transceiver as cluster head 201 and at least one other mobile transceiver 200, 203. The method 30 further comprises providing 38 instructions to the mobile transceivers 200, 201, 203 of the subset to perform the multi-client sampling based on the multi-client sampling request by collecting requested data at the cluster head 201 mobile transceiver using direct communication within the subset of mobile transceivers 200, 201, 203.

Figure 4:
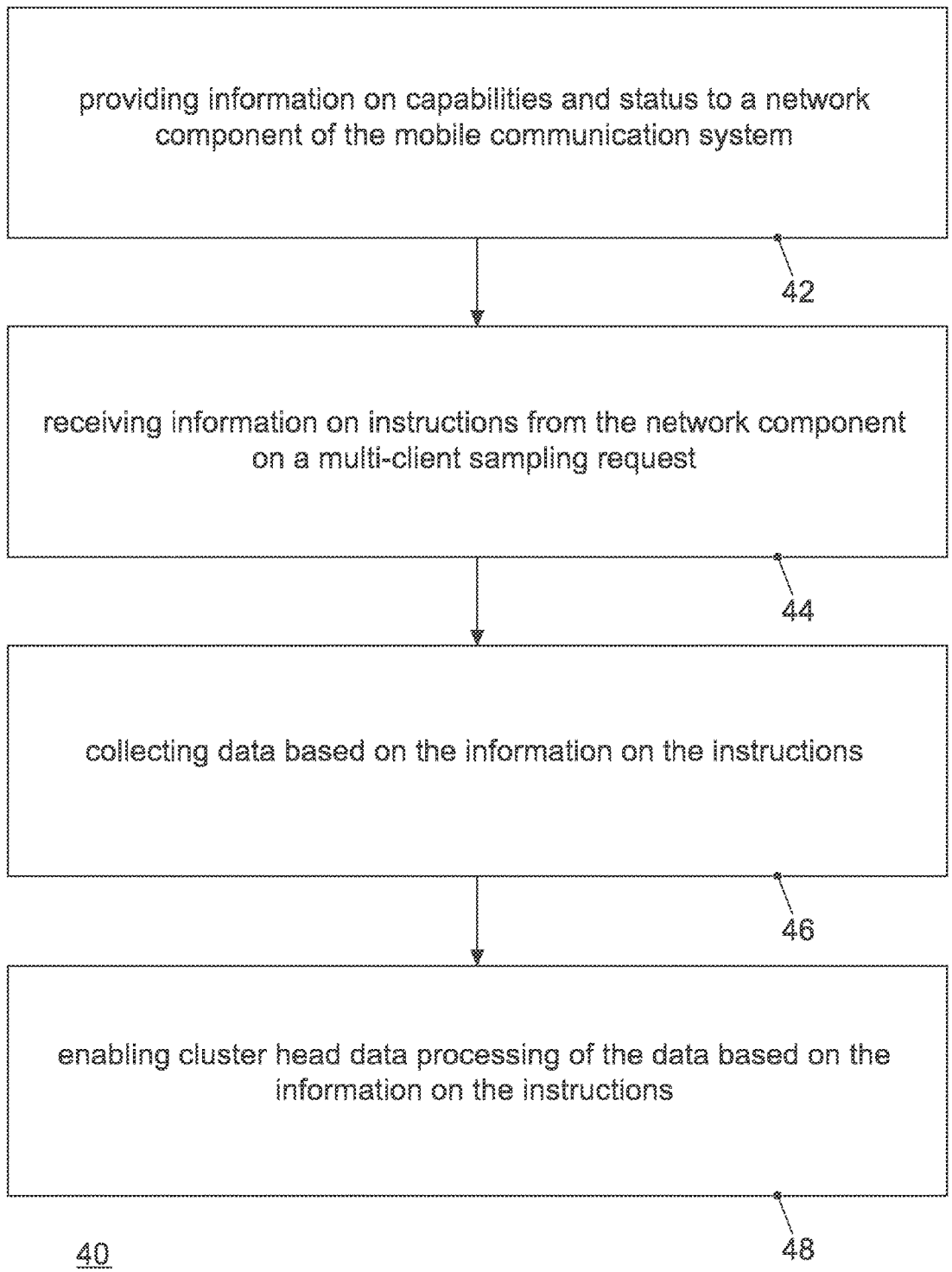
FIG. 4 shows a block diagram of a flow chart of an embodiment of a method for a mobile transceiver.

FIG. 4 shows a block diagram of a flow chart of an embodiment of a method 40 for a mobile transceiver 200, 201, 202, 203, 204. The method 40 comprises providing 42 information on capabilities and status to a network component 10 of the mobile communication system 300, and receiving 44 information on instructions from the network component 10 on a multi-client sampling request. The method 40 further comprises collecting 46 data based on the information on the instructions, and enabling 48 cluster head 201 data processing of the data based on the information on the instructions.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS 10 network component
12 one or more interfaces
14 control module
20 apparatus for mobile transceiver
22 one or more interfaces
24 control module
30 method for network component
32 receiving information on a multi-client sampling request
34 receiving information on capabilities and status of a plurality of mobile transceivers of the mobile communication system
36 determining a subset of the plurality of mobile transceivers based on the information on the multi-client sampling request and based on the information on the capabilities and status, wherein the subset of mobile transceivers comprises at least one mobile transceiver as cluster head and at least one other mobile transceiver
38 providing instructions to the mobile transceivers of the subset to perform the multi-client sampling based on the multi-client sampling request by collecting requested data at the cluster head mobile transceiver using direct communication within the subset of mobile transceivers
40 method for mobile transceiver
42 providing information on capabilities and status to a network component of the mobile communication system
44 receiving information on instructions from the network component on a multi-client sampling request
46 collecting data based on the information on the instructions
48 enabling cluster head data processing of the data based on the information on the instructions
100 server, bases station, network controller
200 mobile transceiver
201 mobile transceiver
202 mobile transceiver
203 mobile transceiver
300 system
400 object

The invention claimed is:

1. A network component of a mobile communication system, the network component comprising:
one or more interfaces configured to communicate with a plurality of mobile transceivers of the mobile communication system, wherein each mobile transceiver of the plurality is in a vehicle; and
a control module comprising a processor, the control module configured to control the one or more interfaces, wherein the control module is further configured to:
receive information on a multi-client sampling request, wherein a multi-client sampling is characterized by a subset of the plurality of mobile transceivers collecting image data on one or more objects in a vehicular environment,
receive information on capabilities and status of the plurality of mobile transceivers,
determine the subset of the plurality of mobile transceivers based on the information on the multi-client sampling request and based on the information on the capabilities and status, wherein the subset of mobile transceivers comprises at least one mobile transceiver as cluster head and at least one other mobile transceiver, and
provide instructions to the mobile transceivers of the subset to perform the multi-client sampling based on the multi-client sampling request by collecting requested data at the cluster head mobile transceiver using direct communication within the subset of mobile transceivers.

2. The network component of claim 1, wherein the information on the multi-client sampling request further comprises information on a geographical area the multi-client request relates to, wherein the control module is configured to select the subset of mobile transceivers based on the information on the geographical area and based on the location of the mobile transceivers.

3. The network component of claim 2, wherein the control module is configured to assign and/or reassign a role of the cluster head based on the information on the geographical area, based on a connectivity status of the mobile transceivers, and based on the location of the mobile transceivers.

4. The network component of claim 1, wherein the vehicular environment comprises at least one of the group of a location, an intersection, a city, a city center, a landscape, another vehicle, an object of interest, a point of interest, and a route section.

5. The network component of claim 1, wherein the control module is configured to obtain sampled multi-client data from the cluster head.

6. The network component of claim 1, wherein the control module is configured to configure an update rate for update provision at the cluster head.

7. The network component of claim 1, wherein:
collecting image data is characterized by the plurality of mobile transceivers capturing an image of the one or more objects in the environment.

8. An apparatus for a mobile transceiver in a vehicle, the apparatus comprising:
one or more interfaces configured to communicate with a network component of a mobile communication system and configured to communicate with one or more further mobile transceivers directly; and
a control module comprising a processor, the control module configured to control the one or more interfaces, wherein the control module is further configured to:
provide information on capabilities and status to the network component of the mobile communication system,
receive information on instructions from the network component on a multi-client sampling of one or more objects in a vehicular environment,
collect image data on the one or more objects in the vehicular environment based on the information on the instructions, and
enable cluster head data processing of the data based on the information on the instructions.

9. The apparatus of claim 8, wherein the information on the instruction comprises information on assuming the role of a cluster head of the multi-client sampling request, and wherein the control module is configured to receive information on data collected by another mobile transceiver, and wherein the control module is configured to process the collected data and the data collected by the other mobile transceiver as cluster head.

10. The apparatus of claim 9, wherein the control module is configured to provide the processed data to the network component.

11. The apparatus of claim 8, wherein the information on the instruction comprises information on another mobile transceiver in another vehicle assuming the role of a cluster head of the multi-client sampling request, and wherein the control module is configured to provide information on collected data to the other mobile transceiver.

12. The apparatus of claim 8, wherein the information on capabilities comprises one or more elements of the group of information on available sensors, information on a location or position of the mobile transceiver, and information on communication capabilities of the mobile transceiver.

13. The apparatus of claim 8, wherein the control module is configured to update location information of the mobile transceiver at the network component.

14. The apparatus of claim 8, wherein:
the control module configured to collect image data based on the information on the instructions is further configured to capture an image of the one or more objects in the vehicular environment.

15. A non-transitory, machine-readable medium including code, when executed, to cause a machine to perform a method for a network component of a mobile communication system, the method comprising:
receiving information on a multi-client sampling request, wherein a multi-client sampling is characterized by a plurality of mobile transceivers of the mobile communication system collecting image data on one or more objects in a vehicular environment, wherein each mobile transceiver of the plurality is in a vehicle;
receiving information on capabilities and status of the plurality of mobile transceivers;
determining a subset of the plurality of mobile transceivers based on the information on the multi-client sampling request and based on the information on the capabilities and status, wherein the subset of mobile transceivers comprises at least one mobile transceiver as cluster head and at least one other mobile transceiver; and
providing instructions to the mobile transceivers of the subset to perform the multi-client sampling based on the multi-client sampling request by collecting requested data at the cluster head mobile transceiver using direct communication within the subset of mobile transceivers.

16. A non-transitory, machine-readable medium including code, when executed, to cause a machine to perform a method for a mobile transceiver in a vehicle, the method comprising:
providing information on capabilities and status to a network component of the mobile communication system;
receiving information on instructions from the network component on a multi-client sampling of one or more objects in the vehicular environment;
collecting image data on the one or more objects in the vehicular environment based on the information on the instructions; and
enabling cluster head data processing of the data based on the information on the instructions.

* * * * *